Figure 20:
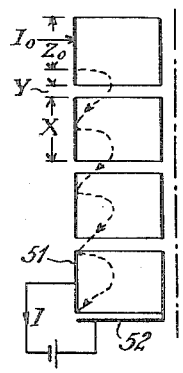

Jan. 5, 1943.  D. GABOR  2,307,035
ELECTRON MULTIPLIER
Original Filed May 26, 1937   3 Sheets-Sheet 1
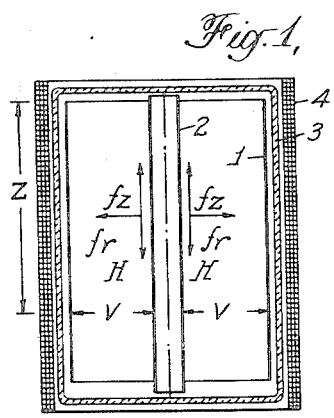
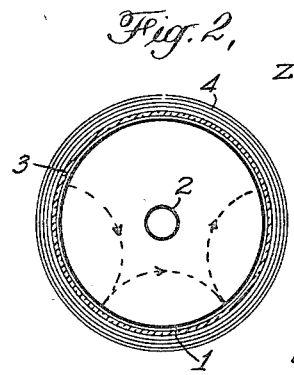
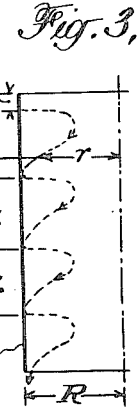
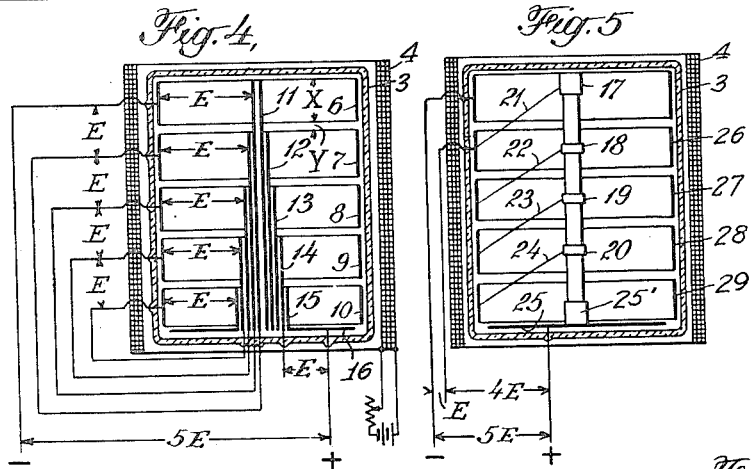
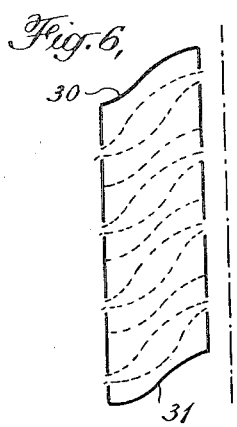
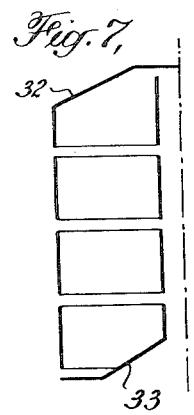
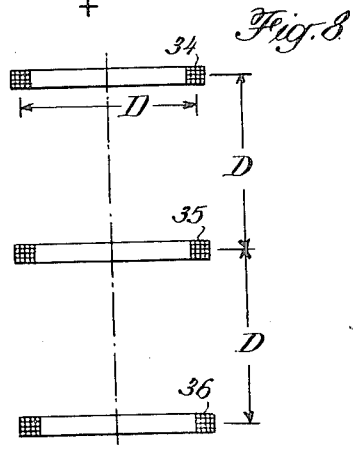
INVENTOR
Dennis Gábor
BY
ATTORNEYS

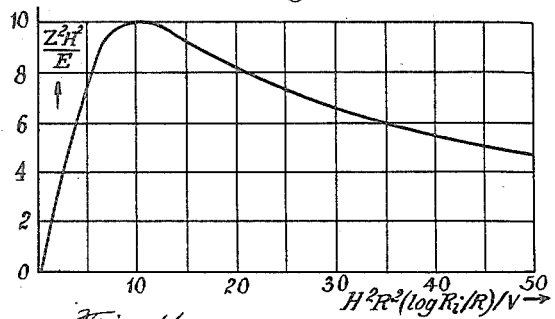
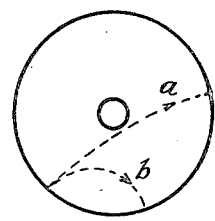
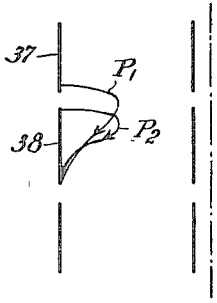
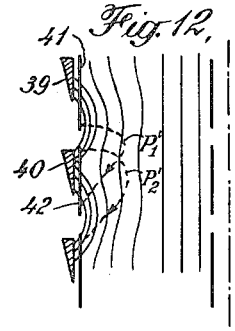
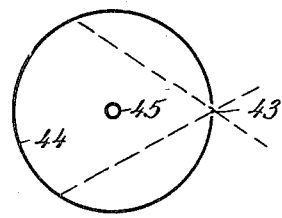
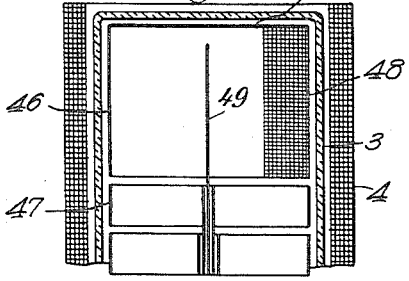
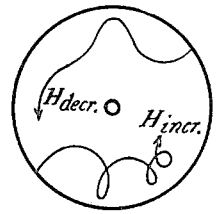
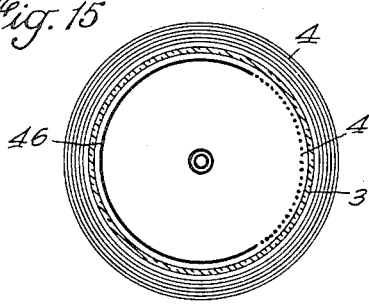
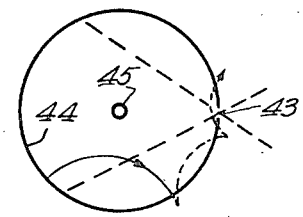

Jan. 5, 1943.                    D. GABOR                    2,307,035
                          ELECTRON MULTIPLIER
                  Original Filed May 26, 1937    3 Sheets-Sheet 3

INVENTOR
Dennis Gabor
BY
ATTORNEYS

Patented Jan. 5, 1943

2,307,035

UNITED STATES PATENT OFFICE 2,307,035

ELECTRON MULTIPLIER

Dennis Gabor, Rugby, England

Original application May 26, 1937, Serial No. 144,787. Divided and this application March 2, 1940, Serial No. 321,993. In Great Britain May 27, 1936

5 Claims. (Cl. 250—20)

This invention relates to electric discharge devices, known under the name of "electron multipliers," in which a primary electron stream is amplified by secondary electron emission. The primary electron stream, which may be produced by photoelectric or by thermionic emission, impinges on an electrode to be called secondary cathode. The secondary electron stream emitted by the secondary cathode impinges in turn on a second secondary cathode and this process is repeated until the secondary electrons emitted by the final secondary cathode impinge on a collecting electrode or anode. If each secondary cathode emits more than one electron for every impinging electron, and the number of steps or stages is chosen sufficiently high, the current collected by the anode or output electrode may be a very high multiple of the primary current. The present application is a division of my copending application Serial No. 144,787 filed May 26, 1937.

One object of the present invention is to provide an improved arrangement of electrodes suitable for a high degree of amplification of photoelectric or thermionic currents by means of electron multiplication. An important feature of this electrode arrangement is that the secondary cathodes are surfaces of rotation, arrayed along an axis of symmetry. A further feature is that one or more axially symmetrical electrodes, to be called auxiliary anodes, are provided inside the secondary cathodes, in order to produce a substantially radial electric field in addition to the substantially axial electric fields produced by the successively rising potentials of the secondary cathodes. A further feature is that means are provided to produce a substantially axial magnetic field in order to prevent the electrons from hitting the said auxiliary anode or anodes.

Another object of the invention is to provide improved means for the amplification of thermionic currents by utilizing electron multiplication. A novel method for controlling the output current is provided by means of modifying the gain of said electron multiplication.

A further object of the invention is to provide means whereby a device according to the invention may be used for the reception of radio or television signals, to perform simultaneously all functions as performed at present by thermionic valves, such as amplification, frequency conversion, demodulation and automatic volume control.

Figure 22:
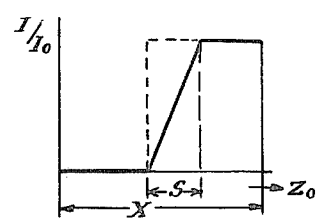
Figure 23:
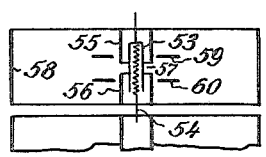
Figure 24:
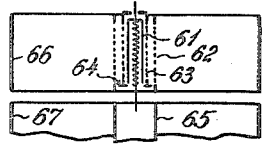
Figure 25:
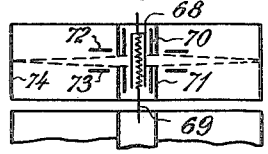
Figure 26:
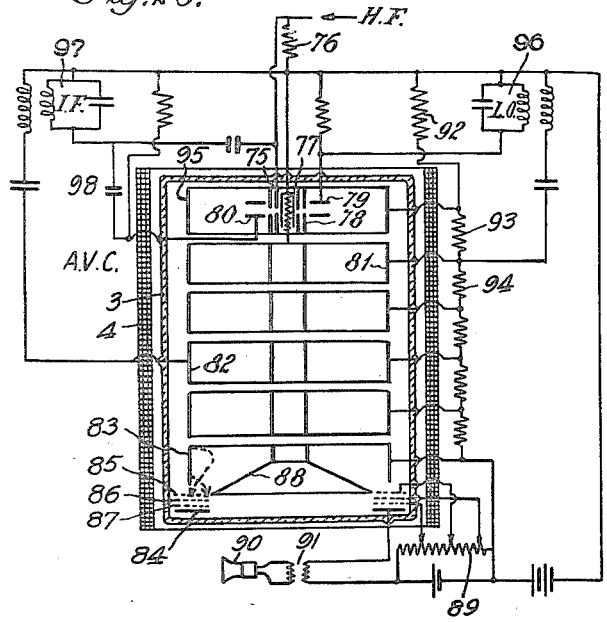

The novel features which I desire to protect herein will be pointed out in the appended claims. The invention may be best understood by reference to the following description and the accompanying drawings. In the drawings Figs. 1, 2 and 3 are diagrammatic representations, explaining the principle of the invention. Figs. 4 and 5 show alternative modifications of a device according to the invention. Figs. 6 and 7 are illustrations of certain improved details in the electrode arrangement. Fig. 8 is a suitable arrangement of magnetic coils, which may be used in connection with the device according to the invention. Figs. 9 to 19 are diagrammatic representations to explain dimensioning and additional aspects of the device according to the invention. Figs. 20 to 23 relate to a novel method for modifying the gain of the device. Figs. 24 and 25 show methods of controlling the intensity of a thermionically produced primary beam. Fig. 26 illustrates the circuits of an electron multiplier according to the invention, whereby it may act as a complete superheterodyne set for radio or television reception.

The principle of the new electron multiplier is shown in Fig. 1, which is a diagrammatic longitudinal section of a schematically simplified device. This is understood to be enclosed in an evacuated envelope 3. 1 and 2 are two cylindrical bodies which have potentials linearly increasing with the distance $z$ measured from the top edge of 1. In every cross section the potential of 2 shall be greater than of 1, and this potential difference may be called V. V can be independent of $z$ or vary to a certain extent which shall be specified later. In the space between 1 and 2 the electric field is therefore composed of a radial field with the intensity $t_r$, the intensity of this field varying inversely with the distance $r$ from the axis, and of a longitudinal field of the intensity $t_z$. To this composite electric field is added according to the invention a longitudinal magnetic field of the intensity H. The electrodes in these and subsequent figures are supported within the evacuated glass envelope 3 by suitable means which are not shown in the drawings in the interest of clearness of illustration.

The electric field as described can be realized by making both 1 and 2 of materials with high resistance, through which currents may be passed in an upward direction. Constructions which are more convenient for practical purposes shall be described later. The magnetic field may be produced for example by means of a long coil 4 placed coaxially around the vessel, or by a tubular permanent magnet, made of a suitable material such as cobalt steel.

If by photoelectric action or by other effects slow electrons are released from the surface of 1, they will start moving towards the central cylinder 2. They will be, however, deflected by the magnetic field and forced to return to 1. This is illustrated in Fig. 2, which shows the projection of the electron paths on a plane perpendicular to the axis. In this figure, 1 is the outer electrode, to be called the cathode, and 2 the inner one, which shall be called auxiliary anode. Fig. 3 shows the paths of the electrons in circular projection on a plane passing through the axis. In these two figures it has been assumed for simplicity that the field components $t_r$, $t_z$, and $H$ are independent of $z$. It will be seen that the electrons return to the cathode after having travelled a vertical distance $Z$, which shall be called the "step length." The two branches of the orbit in Fig. 2 are symmetrical, the electron takes equal times for approaching the inner electrode to a minimum distance and for returning to the cathode surface. As however each electron travels vertically with a uniformly accelerated motion, it will travel one quarter of the step length in the first half of the time and three quarters in the second half. For this reason the two branches of the orbit as they appear in the longitudinal projection in Fig. 3 will be strongly asymmetrical. Assuming that the electron has started with zero velocity, it will return tangentially to the cathode. If the voltage drop along the step length is sufficiently high, it will release secondary electrons. These will start again with very low velocities and describe paths of the same shape, until the last electron leaves the space between the cylinders. If the number of secondary electrons released by one electron is greater than unity, the device will act as a current amplifier or electron multiplier.

Fig. 4 shows one form of my invention embodying the above principles and more convenient for practical use. The figure shows a longitudinal section of the electrode system, enclosed in an evacuated envelope 3. The cathode electrodes consist of a series of coaxial, axially spaced cylinders 6, 7, 8, 9 and 10, each of a length X and separated from one another by slits Y. The cathode surfaces preferably comprise materials suitable for secondary electron emission, such as caesium. Coaxially arranged with the secondary cathodes, there are provided a number of cylinders, numbered 11, 12, 13, 14 and 15, telescopically assembled. The last of these, 15, is connected with the collecting or output anode, the flare 16, which collects the electrons released at the last cathode 10.

The secondary cathodes and auxiliary anodes all have connections with the outside and may be maintained at different potentials with respect to one another. In the arrangement illustrated each anode section is connected with the following cathode section, 11 with 7, 12 with 8, 13 with 9 and 14 with 10. Consequently, if equal potential differences E are impressed between successive cathodes, there will be a constant potential difference between each cathode and the corresponding auxiliary anode. It should be understood however that the stages need not be equal in length or voltage, nor need the radial potential differences be equal to the longitudinal potential differences. The diameter of the cathode cylinders may also vary from stage to stage, and they may be e. g. conical instead of cylindrical. For making the illustration simpler I have, however, assumed equal and cylindrical stages in all the accompanying drawings.

Fig. 5 shows an alternative construction. The auxiliary anode is here a cylinder, which may be made of a material of high specific resistance, or it may be e. g. a ceramic insulating tube, coated with such a material. This is fitted with rings 17, 18, 19 and 20 which divide the high resistance into sections. These are connected by means of thin wires 21, 22, 23 and 24 with the cathode sections 26, 27, 28 and 29. The last ring 25′ is connected with the anode flare 25.

In the foregoing constructions the electric field at the ends of the electrode array is necessarily different from that at the central portions. This can be avoided as shown in Fig. 6 by giving the first cathode 30 and the anode flare 31 shapes identical with those of the potential lines which would exist if the electrode column were infinitely long. Their shape can also be simplified as shown in Fig. 7, where the end plates 32 and 33 are composed of frusto-conical, cylindrical and plane sections.

In some cases it is advantageous to have a coil which produces the magnetic field constructed in such a way that it produces a homogeneous field over the whole volume of the electron multiplier. This has the advantage that in a homogeneous field the relative position of the coil and the device need not be adjusted very accurately. Fig. 8 shows a convenient arrangement. It consists of three single coils 34, 35 and 36 with dimensions which are small as compared with their diameter D, and spaced at the distance D in the axial direction. If the number of ampere turns of 34 and 36 are equal, and the number of ampere turns of the central coil 35 is 11.6 percent of that of 34 or 36, the field strength along the axis will vary by less than ± 1 percent.

The most advantageous dimensions of the device can be obtained by considering the relation which links up its various factors. This equation can be written in the form:

$$Z^2.H^2.E^{-1}=f(H^2.R^2.V^{-1}\log_{10}R_1/R)$$

Here Z is the step length, i. e. the distance in cms. which an electron starting with zero velocity travels in the direction of the axis before returning to the outer cylinder. This must be approximately equal to the stage length $X+Y$, if the device is to work as a multiplier. H is the magnetic field in gausses, E is the potential difference between two successive cathodes, in volts. R is the radius of the cathodes, in cms. V is the potential difference between the cathode and the opposite auxiliary anode. $R_1$ is the radius of the auxiliary anode. The nature of the function $f$ is represented in Fig. 9.

It will be seen that the function $f$ has a maximum. This means that the step length Z has a maximum for a certain value of V in an otherwise determined arrangement. Choosing the operating point at or near this maximum affords the advantage, that small variations of V or of $R_1$ are of no importance. This is shown more particularly in the following numerical example:

According to Fig. 9 the maximum occurs approximately at $$Z^2H^2/E=10, \quad H^2R^2V^{-1}\log_{10}R/R_1=10$$

We can choose freely 4 quantities, e. g. $R=1.5$ cms., $R_1=0.5$ cm., $Z=1$ cm. and E 50 volts. This gives $H=22.5$ gausses and $V=53.5$ volts. Because of the maximum this voltage need not be observed very exactly. Z will be shortened only by 1% or 0.1 mm. if V is 45 or 62 volts, or $R_1$ equal to 0.42 or 0.6 cm. It will be seen that this mode of operation is particularly advantageous for devices of the kind as shown in Fig. 4, as no corrections need to be introduced for the varying diameter of the auxiliary anodes.

Under some conditions it might be advantageous to choose the working conditions so as to remain at the left of the maximum. Near to the origin the function $f$ approaches a straight line, and the equation can be written approximately:

$$\frac{Z}{R} = 1.15 \sqrt{\frac{E}{V} \log_{10} \frac{R}{R_1}}$$

This means that for weak magnetic or very strong electric fields the step length Z depends only on the ratio of the radial and longitudinal potential steps. This can be understood from Fig. 10, in which the electron path $a$ corresponds to a weak magnetic field. The length of this path is very nearly equal to the diameter on which the electron would move in the case of a zero magnetic field. This mode of operation has the great advantage, that the step length is determined entirely by the electrical connections. The magnetic field has only the function of hindering the electrons from hitting the auxiliary anode. This mode of operation is particularly advantageous in the case of thin auxiliary anodes like in Fig. 5.

In the same drawing is also shown a path $b$ which corresponds to the maximal step length. The electron approaches the axis to a minimal distance equal to about 60% of the outer radius. The auxiliary anode can have therefore a rather large diameter, without incurring the risk of the electrons hitting it.

As compared with other electron multipliers, axially symmetrical devices according to the invention have the advantage that lateral scattering of the electron paths has no consequence and no cautions need be taken to avoid it. Scattering in the axial direction might however cause inconveniences as it might prevent a part of the electrons from reaching the last cathode. Such an effect is produced by the inhomogeneity of the longitudinal electric field. Instead of being constant as assumed above, the field is zero along the surfaces of the cathodes and very strong in the slits between them. This produces a focussing effect as shown in Fig. 11. An electron which starts from the lower edge of a cathode 37 comes at the beginning of its path P₁ under the influence of a strong field. We assume that it reaches the corresponding edge of the next cathode 38. An electron however which starts from the top edge of 38 will move at the beginning of its path P₂ in a weak field and might land at the same spot as P₁. Electrons returning to the same cathode are of course wasted. This can be prevented according to the invention by an inhomogeneous magnetic field, which can be produced, as shown in Fig. 12, by putting wedge shaped rings 39, 40 of high magnetic permeability behind the cathodes 41, 42. The cathodes themselves can be also wedge shaped and made of a material with considerable permeability like nickel or nickel-iron alloys. The path P₁' which starts from the edge of 41 crosses therefore a stronger magnetic field than the path P₂'. By choosing a suitable shape and size for the rings 39, 40 it is therefore possible to overcompensate the above mentioned defect and ensure that no electrons go lost by returning to the same cathode from which they have started. If this focussing effect is sufficiently strong, the magnetic field and the driving voltages need not be adjusted very exactly.

The device according to the invention can be conveniently used as a photo-tube, as shown in Fig. 13, projecting the light through a slit 43 at the first cathode 44, which is serving as photocathode. The first auxiliary anode is preferably of small diameter in order to avoid obstruction of light.

Tubes of large surfaces are convenient for certain applications of photo-tubes, especially if the light cannot well be concentrated by optical means. Figs. 14 and 15 show a construction of the electron multiplier according to the invention, to be used as a self-amplifying photo-tube. The first cathode 44 is longer than the following secondary cathode 47. In order to prevent distortion of the electric field, the photocathode 46 is completed to a cylinder by a grid or gauze 48, which covers the window through which the light falls in, but does not cut off too much of the light. The first auxiliary anode 49 is preferably a thin wire, which may be fastened by some insulating member to the top plate 50.

In this case however special measures are necessary in order to prevent the electrons returning to the photo-cathode. This can be done according to the invention by an inhomogeneous magnetic field, the effect of which is shown in Figs. 16 and 17. Fig. 17 shows in a plane perpendicular to the axis the effect of a magnetic field which increases or decreases along the axis $z$. An increasing field will produce a stronger curvature in the returning branch of the curve, so that the electron will turn back before reaching the cathode and will go on moving on a kind of epicycloidal path. A decreasing field on the contrary will not turn the electron back by a full 180°, so that the electron approaching the cathode under a grazing angle will not be able to reach it and will go on moving on a kind of hypocycloidal path. The practical result is however in both cases the same. Both increasing and decreasing fields will prevent the electrons from returning to the cathode. Fig. 16 which shows the path in circular projection on a meridian plane corresponds therefore to both cases. Such inhomogeneous fields can be produced easily either by placing or dimensioning the magnetic coils conveniently or by backing the first cathode with wedge shaped rings of ferromagnetic material.

This measure would have, however, the consequence that the electrons which have departed to a considerable distance from the first cathode would not come back to the second cathode, i. e. the first secondary cathode, even if the field were to become suddenly homogeneous. They can be brought back, however, according to the invention, by a decreasing radial electric field, i. e. by making V to decrease with increasing $z$. The effect of a decreasing V is that the electron will not have lost all its radial velocity when it reaches again the radius R, and that therefore the path has a tendency to move outwards. This is shown in Figs. 19 and 18, where also the virtual prolongation of the path is represented by dotted lines.

The decreasing radial field can be produced by choosing the lengths of the anode sections and their connections with the cathode sections conveniently. The simplest way however is to employ only a single auxiliary anode, such as a solid rod, tube or wire, extending along the whole length of the device. This has also the advantage that the electrons do not strike the cathodes any more under grazing angles, and their paths are consequently less strongly modified by the space charges at higher current densities.

Figure 21:
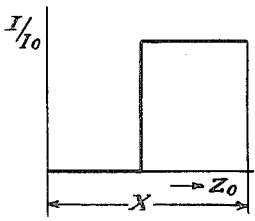

If the device is to be used as a simple phototube, it is important to make its response independent from the point of incidence of the light beam, by the means as explained in connection with Fig. 14. The new device is, however, particularly suitable also for other applications, in which the output current is deliberately made strongly dependent on the position of the incident beam, i. e. on the starting point of the photo-electrons. The principle of such applications is shown in Fig. 20, in which it will be seen that the step length Z is kept somewhat shorter than the stage length $X+Y$. In consequence the electrons starting from the first cathode, (which can be a photo-cathode), at a distance $Z_o$ from the top edge will reach the last circuit only if $Z_o$ is larger than a certain minimum, otherwise they will return to the last cathode 51 instead of reaching the anode 52. We call the first current, (which can be photo-electric), $I_o$, and the current between the last cathode and the anode, $I$. Fig. 21 shows the amplification factor or gain $I/I_o$ as a function of the starting point of the electrons. It is zero below a certain distance and above it jumps suddenly to a finite value. This will be the case, of course, only if the electrons start from one point; in the case of photo-electrons, for example, if the light spot from which they originate is infinitely small. With a spot of finite width the slope becomes finite, as shown in Fig. 22, the length of the slope S being equal to the spot width. In this range the amplification factor is a linear function of the spot position, if the light density is homogeneous. This phenomenon can therefore be used, for example, in conjunction with mirror galvanometers, with instruments for precision measurements of small movements, for sound registration and reproduction, etc.

The electron emission from the first cathode ring can also be produced by a beam of electrons instead of by a light beam. The new electron multiplier is particularly suitable as a thermionic amplifier because of its axial symmetry. In Fig. 23, 53 is an indirectly heated thermionic cathode with a heating filament 54. 55 and 56 are two cylindrical tubes, forming between themselves an annular slit 57. The potential of 55 and 56 is higher than of the first cathode 58 and the potential of 53 is lower than that of 58 by about an equal amount. The beams are therefore ejected from the slit with a rather high velocity and somewhat retarded in the outer space. It can be shown that the magnetic field will not prevent these "primary" electrons from reaching the cathode 58, whereas it will be strong enough for keeping the secondary electrons away from the inner system.

Two plane rings 59 and 60 fitted outside the slit are serving as deflecting plates. By impressing a variable potential between them, the beam can be deflected in the axial direction. By adjusting the dimensions conveniently, deflections of the order of 0.1–1.0 mm./volt can be obtained. This can result in variations of the final current of the order of several milliamperes per volt, which is of the order of the "slopes" of the ordinary thermionic valves. The amplification factor "mu" is extremely high, as the voltage of the output anode has hardly any effect on the current.

This kind of control shall be called "deflection control" for differentiating it from "intensity control," as shown in Fig. 24. In this second kind of control the intensity of the beam is varied, without changing its position. In Fig. 24, 61 is a thermionic cathode. This is fitted with two grids, 62 and 63, so as to form a small thermionic valve with a perforated anode. 62 is an accelerating grid, 63 is the control grid. This is fitted with side rings 64 in order to prevent the electrons from flying to the next auxiliary anode section 65.

The electrons fly through the meshes of the anode grid 62 to the first secondary cathode 66, from there to 67 and so on. It is a particular advantage of this arrangement that the field between the cathode 66 and the anode grid 62 is completely separated electrically from the small thermionic tube which is serving as electron source. The grid is serving at the same time as accelerating and as auxiliary anode. The small thermionic amplifier can also be fitted with more than one grid. It is particularly advantageous to provide an "anode screen grid" between 62 and 63.

In operating such a device the intensity of the current is controlled by the grid, and the electron multiplier reproduces the characteristics of the small thermionic amplifier faithfully, multiplying the current by a small factor. In consequence extraordinarily steep characteristics can be obtained, without any perceptible anode reaction, as the currents flowing in the first stage are extremely small. It is advisable to use self-focussing arrangements, like the one shown in Fig. 12, in order to utilize the whole surface of the secondary cathodes, especially in the later stages, where the currents are considerable.

Intensity control and deflection control can be also combined as shown in Fig. 25. Here 68 is the thermionic cathode with the filament 69; 70 the controlling electrode, which is a small cylinder with a slit; 71 the accelerating electrode; 72 and 73 are the two deflecting plates. As the position of the beam can be controlled by either of the deflecting plates, this device contains three possibilities for applying controlling voltages. This arrangement has also the advantage that the controlling and the accelerating electrode can be adjusted in such a way as to concentrate the beam at the secondary cathode 74 in a narrow angular zone.

A third manner of control is control by the longitudinal magnetic field. This can be a very sensitive control if the initial beam is narrow and no self-focussing measures are applied. The sensitivity depends also on the position of the working point on the curve in Fig. 9. Near its maximum Z and H are simply reciprocal, i. e. 1% increase of H causes 1% decrease in step length. If there are e. g. 10 stages, this means a shifting of the position of the last spot of incidence by 10% of the stage length. We see therefore that it is possible to produce very considerable current variations with magnetic fields of less than 1 gauss. In order to make high frequency control possible, the cathode rings must be split.

A further possibility of control according to the invention is electrostatic control after the last stage. This will be explained in connection with an example, in which I intend to show that the new electron multiplier can perform, according to the invention, all the functions which are performed by valves in superheterodyne receiver sets, i. e. amplification, frequency conversion, rectification, (demodulation), and automatic volume control.

Fig. 26 shows the diagram of an electron multiplier with circuit connections and additional circuit elements, in which the multiplier performs all the functions of the several tubes in a superheterodyne receiver, for sound broadcasting or television reception, without any other tubes.

The signal is applied to the control grid 75 by means of the coupling resistance 76. This point is marked by "H. F." which means the high frequency of the carrier wave. The aerial circuit is not shown in the figure. The construction of the thermionic system for the emission of the primary electrons is the same as in Fig. 25. It consists of a thermionic cathode 77, a control electrode 75, an accelerating electrode 78 and deflecting plates 79 and 80. One deflecting plate, 79, is used for heterodyning, (frequency conversion); the other, 80, for automatic volume control. The plate 79 is energized by a local oscillator 96, labeled "L. O.", by means of regenerative oscillations with a frequency $f_0$. These are produced by picking up the oscillations at one of the intermediary secondary cathodes, 81 in the figure, and feeding them back to the plate 79 across the tuned reactor circuit marked "L. O."

The action of the heterodyning plate can be understood from Fig. 22. The voltage of the deflecting plate controls the factor by which the electron current is amplified and produces with the original frequency $f_h$ the two beat frequencies $f_h+f_0$ and $f_h-f_0$. The latter may be called intermediate frequency $f_i$. It may be conveniently about 10% of the original frequency $f_h$. This intermediate frequency is filtered out and amplified by selective regeneration. It is picked up at one of the intermediate secondary cathodes, 82, and fed back to the control grid 75 through the reactor circuit 97 marked "I. F.", which is tuned to the intermediate frequency $f_i$. This frequency is now again amplified and also heterodyned, so that the signal received at the final stage is a modulated wave of three carrier frequencies $f_h$, $f_h-f_0$ and $f_h-2f_0$. This has however no detrimental effect on the selectivity of the set, as all three oscillations are derived from and proportional to the oscillation with the intermediate frequency which has been filtered through the circuit I. F. The regeneration of the intermediate frequency ensures moreover a high degree of modulation throughout the device, and therefore makes it possible to utilize the current capacity of the device to its limit. A further advantage is that the "conversion conductance" can be kept rather low and harmonic distortion can be avoided.

The final stage of the device consists of the last secondary cathode, 83, the anode 84 and three grids 85, 86 and 87. The first grid is placed about one step length below the middle of the last cathode. The electrons have here velocities nearly in axial direction. This has the advantage that as they move through the grids 85—87 they will be proceeding in the direction of the magnetic field, which therefore will not interfere with their movement.

This final system can be used in various ways. It could be used e. g. for frequency conversion, if an additional valve were to be used for the loudspeaker or other output device. In the present example I intend however to show that the new electron multiplier is a self-contained device and explain the use of the final stage as a rectifier (current detector or demodulator).

The grid 85, which has the same potential as the "guard ring" 88, i. e. the potential which the next secondary cathode would have if the system were continued, is acting as an accelerating (space charge) grid. Its potential is derived from a potentiometer 89. The control grid 86 has a potential only little higher than the last cathode. For simplicity's sake the grid bias is shown in the figure as being derived from the same potentiometer 89. Between anode and control grid is placed the anode screen grid 87.

If the control grid is conveniently biassed, its action will be to cut off the anode current beyond a certain current value and make it flow back to the space charge grid 85. The rectified current can be derived either from the anode or from 85. In the figure the loudspeaker 90 is energized from the anode across a transformer 91. In the case of television the modulating electrode of the cathode ray tube is to be connected with 84 or 85 through a suitable bias.

Automatic volume control (A. V. C.) is effected in the following way. The reaction with the filtered intermediate frequency is applied not only to the control grid, but also through the condenser 98, to the second deflecting plate, 80, opposite to the plate 79 which is used for heterodyning. The plate 80 is, however, placed so near the electron beam that at positive potentials it would attract a sufficient number of elecrons for neutralizing its charge. It will assume therefore a negative charge so as just to repel nearly all electrons, i. e. it will assume a charge proportional to the high frequency amplitude and produce a corresponding deflection of the beam in the upward direction. The greater, therefore, the intensity of the high frequency signal, the nearer the top of secondary cathode 95 will be the starting point of the electrons, and this will result, according to Fig. 22, in a smaller amplification factor.

Fig. 26 shows also the system of potential dividers, formed by resistances 92, 93, 94 . . . by which the suitable potentials are applied to the secondary cathodes.

While I have shown particular embodiments of my invention, it will be understood that many modifications and applications may be made by those skilled in the art without departing from the invention as set forth in this specification and in the appended claims.

What I claim as new and desire to secure by Letters Patent of the United States is:

1. Apparatus for heterodyning an input signal with a local oscillation frequency comprising, in combination, an electron multiplication device of the type in which amplification of a primary electron beam is obtained by means of secondary electron emission from a series of successively arranged electrodes, said device containing means for controlling the intensity of the primary beam and a deflecting electrode positioned to deflect the primary beam and thereby vary the amplification factor of the device, means for controlling the intensity of the primary beam in accordance with the strength of an input signal, and means for heterodyning said input signal with a local oscillator frequency including a tuned oscillator circuit for the local oscillator frequency in circuit between one of the secondary emission electrodes and said deflecting electrode.

2. In combination, an electron multiplication device of the type in which amplification of a primary electron beam is obtained by means of secondary electron emission from a series of successively arranged electrodes, means for controlling the intensity of the primary beam in accordance with the strength of an input signal, and means for feeding back to a controlling electrode an oscillation proportional to the strength of the input signal, such means including a tuned oscillator circuit connecting between one of the secondary emission electrodes and a controlling electrode.

3. In combination, an electron multiplication device of the type in which amplification of a primary electron beam is obtained by means of secondary electron emission from a series of successively arranged electrodes, means for controlling the intensity of the primary beam, and means for controlling the gain of the device in such a sense as to keep the output substantially constant; the last-mentioned means including a deflecting electrode positioned and energized to deflect the primary beam proportionally to the signal strength, and a second deflecting electrode positioned so that increasing deflection oscillations of the primary beam cause primary electrons to impinge on the second deflecting electrode to produce an increasingly negative charge thereon, said second deflecting electrode being positioned so that its charge superimposes on the beam a steady deflection in such a sense as to reduce the amplification factor of the device.

4. In combination, an electron multiplier of the type in which amplification of a primary electron beam is obtained by means of secondary electron emission from a series of successively arranged electrodes, means for controlling the intensity of the primary beam and its position of incidence on the first of the secondary emission electrodes in such a way as to obtain at the last secondary emission electrode a current the variations of which are proportional to the input signal strength, means for demodulating this signal in the circuit between the last secondary emission electrode and an output anode; the last mentioned means including a first grid between the last secondary emission electrode and the anode acting as space-charge grid and having a potential substantially above the potential of the last secondary emission electrode, and a second grid nearer the output anode than said first grid and biased so that the current above a selected level is substantially collected by said space charge grid.

5. In combination, an electron multiplier of the type in which amplification of a primary electron beam is obtained by means of secondary electron emission from a series of successively arranged electrodes, means for controlling the primary beam intensity proportionally to the input signal strength, deflecting means for controlling the position of incidence of the primary beam on the first secondary emission electrode to thereby vary the amplification factor of the device, means for impresing on said deflecting means an oscillation produced by a local oscillator, means for feeding back a fraction of the amplified oscillation to the input control electrode, and means for demodulating the heterodyned and amplified signal in said device; the last-mentioned means including an output anode, a first grid between the last secondary emission electrode and said output anode acting as space-charge grid and having a potential substantially above the potential of the last secondary emission electrode, and a second grid nearer the output anode than said first grid and biased so that the current above a selected level is substantially collected by said space-charge grid.

DENNIS GABOR.